US008774677B2

(12) United States Patent
Sakurai et al.

(10) Patent No.: US 8,774,677 B2
(45) Date of Patent: Jul. 8, 2014

(54) DEVELOPING MEMBER, PROCESS CARTRIDGE AND ELECTROPHOTOGRAPHIC IMAGE FORMING APPARATUS

(71) Applicant: Canon Kabushiki Kaisha, Tokyo (JP)

(72) Inventors: Yuji Sakurai, Susono (JP); Masaki Yamada, Mishima (JP); Genya Anan, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/886,085

(22) Filed: May 2, 2013

(65) Prior Publication Data

US 2013/0243480 A1 Sep. 19, 2013

Related U.S. Application Data

(63) Continuation of application No. PCT/JP2012/007937, filed on Dec. 12, 2012.

(30) Foreign Application Priority Data

Dec. 28, 2011 (JP) ................................ 2011-288329
Dec. 6, 2012 (JP) ................................ 2012-267390

(51) Int. Cl.
*G03G 15/08* (2006.01)
*C08G 18/06* (2006.01)

(52) U.S. Cl.
USPC ............... 399/111; 399/286; 528/44; 528/85; 528/367

(58) Field of Classification Search
USPC ....................... 399/111, 286; 528/44, 85, 367
See application file for complete search history.

(56) References Cited

U.S. PATENT DOCUMENTS

| | | | |
|---|---|---|---|
| 6,725,002 | B2 | 4/2004 | Sakurai et al. |
| 7,201,967 | B2 | 4/2007 | Sakurai et al. |
| 7,797,833 | B2 | 9/2010 | Nakamura et al. |

(Continued)

FOREIGN PATENT DOCUMENTS

| | | | |
|---|---|---|---|
| JP | 11-65265 | A | 3/1999 |
| JP | 2008-20900 | A | 1/2008 |

(Continued)

OTHER PUBLICATIONS

PCT International Search Report and Written Opinion of the International Searching Authority, International Application No. PCT/JP2012/007937, Mailing Date Jan. 22, 2013.

(Continued)

*Primary Examiner* — Thao T. Tran
(74) *Attorney, Agent, or Firm* — Fitzpatrick, Cella, Harper & Scinto

(57) ABSTRACT

The present invention provides a developing member onto which a toner or the like is hard to fuse and with which toner conveying performance is unlikely to vary even through long-term usage. The developing member includes a substrate and a surface layer, the surface layer contains a polyurethane resin working as a binder resin and polyurethane resin particles dispersed in the binder resin, and the polyurethane resin working as the binder resin has, between two adjacent urethane bonds, a structure represented by a structural formula (1) and one or both of structures represented by structural formulas (2) and (3), and further has, between two adjacent urethane bonds, a structure represented by a structural formula (4).

4 Claims, 6 Drawing Sheets

(56) References Cited

U.S. PATENT DOCUMENTS

| | | | | |
|---|---|---|---|---|
| 7,799,398 | B2 | 9/2010 | Nakamura et al. | |
| 7,947,339 | B2 | 5/2011 | Yamauchi et al. | |
| 7,979,004 | B2 | 7/2011 | Tanaka et al. | |
| 8,182,405 | B2 | 5/2012 | Kurachi et al. | |
| 8,503,916 | B2 | 8/2013 | Anan et al. | |
| 2009/0245892 | A1 | 10/2009 | Obara et al. | |
| 2011/0110690 | A1* | 5/2011 | Lim et al. | 399/286 |
| 2012/0195631 | A1* | 8/2012 | Yamada et al. | 399/111 |
| 2013/0004211 | A1 | 1/2013 | Ishii et al. | |
| 2013/0028634 | A1 | 1/2013 | Koyanagi et al. | |
| 2013/0279937 | A1 | 10/2013 | Nakamura et al. | |
| 2013/0287454 | A1 | 10/2013 | Anan et al. | |

FOREIGN PATENT DOCUMENTS

| | | | |
|---|---|---|---|
| JP | 2008-96635 | A | 4/2008 |
| JP | 2008-262044 | A | 10/2008 |
| JP | 2009-237463 | A | 10/2009 |
| JP | 2010-107968 | A | 5/2010 |

OTHER PUBLICATIONS

Urushihara, et al., U.S. Appl. No. 13/770,796, filed Feb. 19, 2013.

* cited by examiner

DEVELOPING MEMBER, PROCESS CARTRIDGE AND ELECTROPHOTOGRAPHIC IMAGE FORMING APPARATUS

CROSS-REFERENCE TO RELATED APPLICATIONS

This application is a continuation of International Application No. PCT/JP2012/007937, filed Dec. 12, 2012, which claims the benefit of Japanese Patent Applications No. 2011-288329, filed Dec. 28, 2011 and No. 2012-267390, filed Dec. 6, 2012.

BACKGROUND OF THE INVENTION

1. Field of the Invention

The present invention relates to a developing member, a process cartridge and an electrophotographic image forming apparatus.

2. Description of the Related Art

As an image forming method to be employed by an electrophotographic image forming apparatus such as a copying machine or an optical printer, a developing method using a non-magnetic one-component toner is known. Specifically, a photoconductor that is a rotatable electrostatic latent image carrier is charged by a charging member such as a charging roller, and an electrostatic latent image is formed on the surface of the charged photoconductor through exposure with a laser beam. Next, in a developing apparatus included in the image forming apparatus, a toner held in a developer container is applied onto a developing member by a developer supplying member and a developer amount regulating member, and the electrostatic latent image is developed with the toner in a contact part between the photoconductor and the developing member. Thereafter, the toner image thus formed on the photoconductor is transferred onto a recording material in a transfer part through or not through an intermediate transfer body, the toner image is fixed onto the recording material with heat and pressure in a fixing part, and the recording material having the fixed image thereon is discharged out of the image forming apparatus.

In this image forming method, the developing apparatus has, for example, the following constitution: A developing roller is provided so as to cover an opening of the developer container holding a toner and to be partially exposed to the outside of the container to have an exposed portion opposing a photoconductor. A developer supplying member for supplying the toner to the developing roller and a developer amount regulating member for forming a toner layer on the developing member so as to regulate the amount of toner present on the developing member to be constant are provided within the developer container. After developing an electrostatic latent image, the toner remaining on the developing member is scraped off by the developer supplying member, and the thus collected toner is mixed with the toner held in the developer container.

As for the developing member used in such a non-magnetic one-component developing method, in order to attain uniform charge imparting property for a toner and uniform toner conveying property, a technique in which minute irregularities are formed on the surface of the developing member by allowing fine resin particles to be contained in a resin used for forming a surface layer of the developing member has been proposed (Japanese Patent Application Laid-Open No. H11-065265).

SUMMARY OF THE INVENTION

With recent diversification of use environment of electrophotographic image forming apparatuses, electrophotographic image forming apparatuses are now required to show stable image forming performances even under severer environment.

When an electrophotographic image forming apparatus has been used for outputting a large number of images under environment of a low temperature and low humidity (for example, a temperature of 15° C. and relative humidity of 10%), the quality of electrophotographic images is sometimes degraded. Such degradation of the quality of electrophotographic images is presumed to be caused because a toner is fused onto a surface of the developing member during long-term usage and hence the charge imparting performance and the toner conveying performance of the developing member are varied.

The fusion itself of the toner onto the surface of the developing member can be suppressed by softening a surface layer of the developing roller. When the surface layer is softened, however, resin particles (roughing particles) included in the surface layer for forming convex portions in the surface layer are liable to fall off, and therefore, the surface shape of the developing member is changed over time, which sometimes varies the toner conveying performance over time. The variation over time of the toner conveying performance can be a cause of degradation over time of the quality of electrophotographic images.

Therefore, the present invention is directed to providing a developing member onto which a toner or the like is hard to fuse and with which toner conveying performance is unlikely to vary even through long-term usage. Furthermore, the present invention is directed to providing an electrophotographic apparatus and a process cartridge contributing to stable supply of high-quality electrophotographic images.

As for a developing roller having a surface layer containing a polyurethane resin as a binder resin and polyurethane resin particles dispersed in the binder resin, the present inventors have found that the surface layer can be softened and falling of the resin particles off from the surface layer can be suppressed when the binder resin has a specific structure. It has been also found that the fusion of a toner otherwise caused after long-term image output can be suppressed as a result, and that an image failure derived from the fusion of the toner can be suppressed. The present invention has been accomplished based on such finding.

According to one aspect of the present invention, there is provided a developing member including a substrate and a surface layer, wherein the surface layer contains a polyurethane resin working as a binder resin and polyurethane resin particles dispersed in the binder resin, and the polyurethane resin working as a binder resin has, between two adjacent urethane bonds, a structure represented by the following structural formula (1) and one or both of structures represented by the following structural formulas (2) and (3), and further has, between two adjacent urethane bonds, a structure represented by the following structural formula (4):

Structural Formula (1)

$$-CH_2-CH_2-CH_2-CH_2-O-$$

Structural Formula (2)

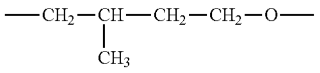

Structural Formula (3)

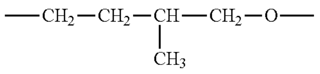

Structural Formula (4)

$—CH_2—CH{=}CH—CH_2—$

According to another aspect of the present invention, there is provided an electrophotographic process cartridge configured to be removably attached to a main body of an electrophotographic image forming apparatus and including the aforementioned developing member.

According to further aspect of the present invention, there is provided an electrophotographic image forming apparatus including the aforementioned developing member.

According to the present invention, softening of a surface layer of a developing member and suppression of falling of resin particles off from the surface layer caused after long-term image output can be both attained, and as a result, a charging member whose charging performance is unlikely to vary even through long-term usage can be obtained. Besides, the present invention can provide a process cartridge and an electrophotographic image forming apparatus capable of providing high-quality images.

Further features of the present invention will become apparent from the following description of exemplary embodiments with reference to the attached drawings.

DESCRIPTION OF THE EMBODIMENTS

Developing Roller

Figure 1A:
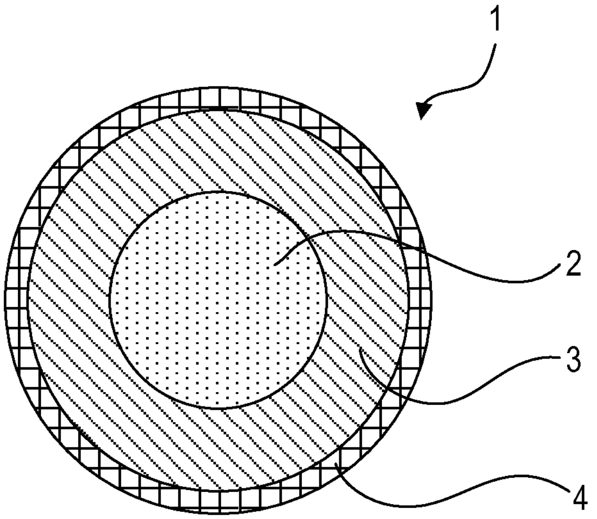
FIG. 1A is a schematic cross-sectional view of an example of a developing roller of the present invention.
Figure 1B:
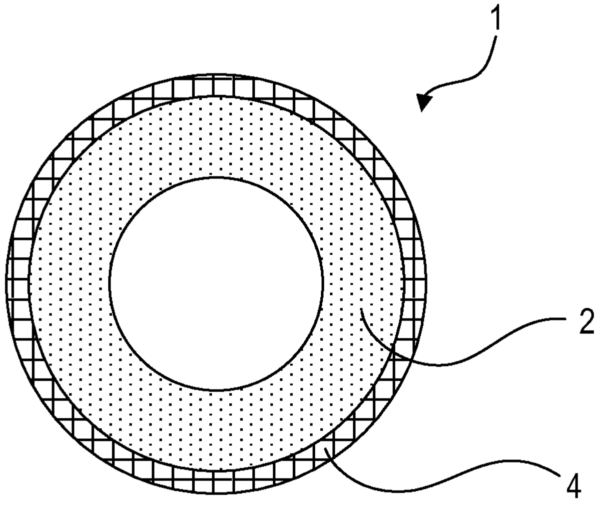
FIG. 1B is a schematic cross-sectional view of another example of a developing roller of the present invention.

A developing member according to the present invention includes, as illustrated in FIG. 1A or FIG. 1B, a cylindrical or hollow cylindrical substrate (mandrel) 2 and a surface layer 4. When the substrate 2 is in a cylindrical shape, the developing member further includes, as illustrated in FIG. 1A, an elastic layer 3 disposed between the substrate 2 and the surface layer 4. Particularly in a non-magnetic one-component contact developing system process, a developing roller having the elastic layer 3 can be suitably used.

(Substrate)

The substrate 2 has conductivity and functions as an electrode and a supporting member of a developing roller 1, and is made of a conductive material like a metal or an alloy such as aluminum, copper alloy or stainless steel, or chromium- or nickel-plated iron.

Incidentally, the surface of the mandrel can be coated with a primer for improving adhesive property between the mandrel and the elastic layer described later. Examples of the primer that can be used include a silane coupling agent-based primer, and urethane-, acrylic-, polyester-, polyether- and epoxy-based thermosetting or thermoplastic resins.

Examples of commercially available primers include:

"DY39-051," "DY39-067" and "DY39-115" (all are trade names, manufactured by Dow Corning Toray Co., Ltd.);

"X-33-173," "PRIMER-NO. 4," "PRIMER-NO. 32" and "PRIMER-NO. 35" (all are trade names, manufactured by Shin-Etsu Chemical Co., Ltd.); and "XP81-405," "XP81-A6361," "XP81-B7015," "ME21," "ME151," "ME153" and "XC9214" (all are trade names, manufactured by Momentive Performance Materials Japan LLC).

Such a primer can be colored with a dye or a pigment. Examples of the dye and the pigment include a monoazo dye, a polyazo dye, an anthraquinone derivative, an anthrone derivative-based anthraquinone dye/pigment, a phthalocyanine dye/pigment, an acridine dye, an azine dye, an oxazine dye, a thiazine dye, a fluorescent dye, an azoic dye, red oxide, carbon black and titanium oxide. One of these dyes/pigments may be singly used or two or more of the dyes/pigments may be used in combination. More specific examples of the dyes/pigments include the following:

For coloring the aforementioned commercially available primers in particular, Solvent Blue 44, Solvent Blue 70, Pigment Blue 15, Solvent Black 3 or Pigment Red 122 may be suitably used.

(Elastic Layer)

The elastic layer 3 is provided for imparting, to the developing roller 1, hardness and elasticity for allowing the developing roller to be pressed against a photoconductor with an appropriate nip width and nip pressure, so that an appropriate amount of toner can be supplied to an electrostatic latent image formed on the surface of the photoconductor. The elastic layer 3 can be made of various rubber materials. Examples of rubber to be used in the rubber materials include ethylene-propylene-diene copolymer rubber (EPDM), acrylonitrile-butadiene rubber (NBR), chloroprene rubber (CR), natural rubber (NR), isoprene rubber (IR), styrene-butadiene rubber (SBR), fluororubber, silicone rubber, epichlorohydrin rubber and urethane rubber. One of such rubbers can be singly used or a mixture of two or more of the rubbers can be used. Among these rubbers, silicone rubber can be used. Examples of the silicone rubber include polydimethylsiloxane, polymethyltrifluoropropylsiloxane, polymethylvinylsiloxane, polyphenylvinylsiloxane and copolymers of these siloxanes.

The elastic layer 3 appropriately includes various additives such as a conductivity-imparting agent, a non-conductive filler and a catalyst. As the conductivity-imparting agent, fine particles of a conductive metal such as aluminum or copper, fine particles of a conductive metal oxide such as zinc oxide, tin oxide or titanium oxide, or carbon black can be used. Among these substances, carbon black can be particularly suitably used because carbon black is comparatively easily available and gives good conductivity. If carbon black is used as the conductivity-imparting agent, the carbon black is included in a content of 10 to 80 parts by mass based on 100 parts by mass of rubber included in the rubber material. Examples of the non-conductive filler include silica, quartz powder, titanium oxide, zinc oxide and calcium carbonate.

The elastic layer 3 has a thickness in the range of preferably 1.5 to 5.0 mm and more preferably 2.0 to 4.0 mm.

(Surface Layer)

The surface layer of the present invention contains polyurethane resin particles dispersed in a binder resin in order to cause roughness on the surface for attaining toner conveying property.

The binder resin of the surface layer of the present invention is a polyurethane resin.

The polyurethane resin has, between two adjacent urethane bonds, a structure represented by the following structural formula (1); and one or both of structures represented by the following structural formulas (2) and (3), and further, between two adjacent urethane bonds, a structure represented by the following structural formula (4):

Structural Formula (1)

$$-CH_2-CH_2-CH_2-CH_2-O-$$

Structural Formula (2)

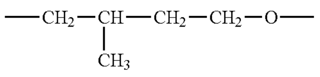

Structural Formula (3)

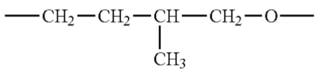

Structural Formula (4)

$$-CH_2-CH{=}CH-CH_2-$$

Figure 8:
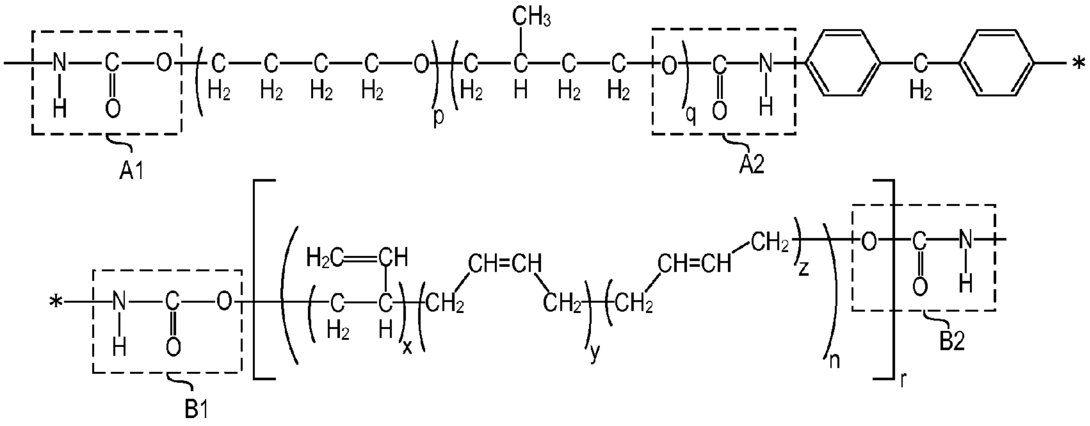
FIG. 8 illustrates a characteristic structure of a urethane resin according to the present invention.

FIG. 8 illustrates a part of a characteristic structure of the urethane resin according to the present invention. Specifically, in FIG. 8, the structure represented by the structural formula (1) and the structure represented by the structural formula (2) are disposed between two adjacent urethane bonds A1 and A2. Furthermore, the structure represented by the structural formula (4) is disposed between two adjacent urethane bonds B1 and B2, which combination is different from a combination of the urethane bonds A1 and A2. It is noted that p, q, r, x, y, z and n each independently represent a positive integer in FIG. 8.

It is not clear why the surface layer including the polyurethane resin according to the present invention can suppress falling of the polyurethane resin particles used as roughing particles although the surface layer is flexible. The reason is, however, presumed as follows based on results of observation of states of surface layers of the developing roller according to the present invention and a developing roller not having the constitution according to the present invention used in formation of electrophotographic images over a long period of time.

Figure 5:
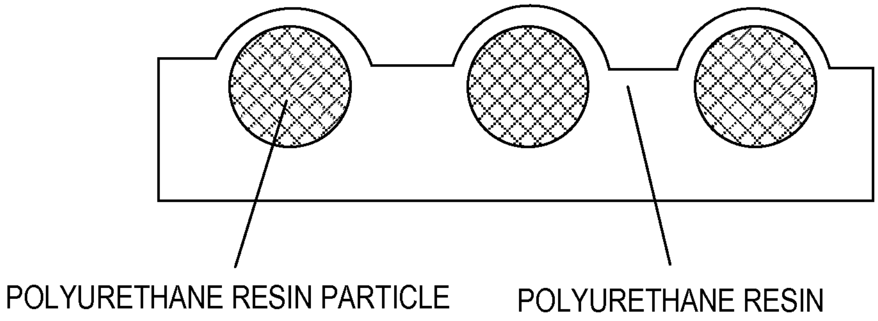
FIG. 5 is a cross-sectional image of a developing roller obtained before outputting images.

In both the developing roller according to the present invention and the developing roller not having the constitution according to the present invention, there are convex portions formed by the resin particles on the surfaces at an initial stage as illustrated in FIG. 5. Furthermore, the resin particles are covered with the binder resin so as to be held within the surface layer. As these developing rollers are used over time, the binder covering the resin particles is gradually abraded in both the developing rollers.

Figure 6:
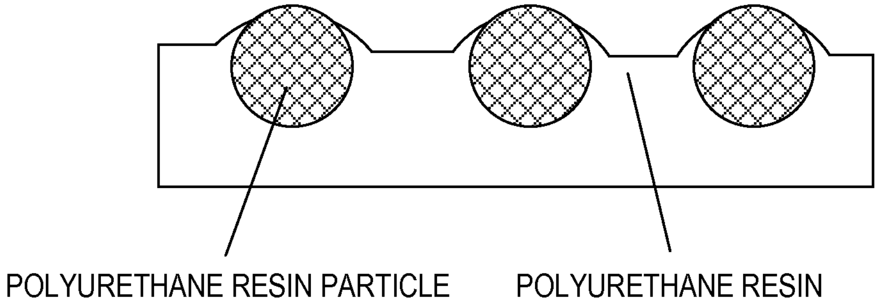
FIG. 6 is a cross-sectional view of the developing roller in which a polyurethane resin is abraded around a convex portion formed by a polyurethane resin particle after outputting images.

When these developing rollers were continuously used for a long period of time, however, a definite difference occurs in a situation of the falling of the resin particles off from the surface layer. Specifically, in the developing roller according to the present invention, although the binder resin covering the resin particles was abraded as illustrated in FIG. 6, the resin particles were definitely held by the remaining binder resin within the surface layer, and thus, the falling of the resin particles from the surface layer was suppressed.

Figure 7:
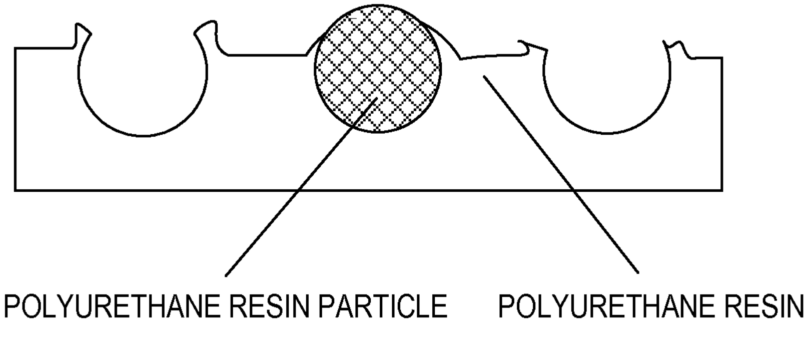
FIG. 7 is a cross-sectional view of the developing roller in which the polyurethane resin is abraded around the convex portion formed by the polyurethane resin particle and further the resin particle has fallen off after outputting images.

On the other hand, in the developing roller not having the structure according to the present invention, a large number of resin particles were found to fall off from the surface layer as illustrated in FIG. 7. Furthermore, in a portion where a resin particle had been present, a trace as if the binder resin had been torn off was found. Besides, it was found that the resin particle had fallen off and fusion of a toner seriously proceeded in a portion with such a trace.

Based on the results of this experiment, it seems that the surface layer including the resin according to the present invention shows high holding power for the resin particles when external force is applied to the resin particles. The present inventors presume the reason as follows:

In the urethane resin according to the present invention, a portion having the structure represented by the structural formula (1) and one or both of the structures represented by the structural formulas (2) and (3) between two adjacent urethane bonds (hereinafter sometimes referred to as the "section A") is unlikely to be crystallized and flexible as compared with conventional polyether urethane because a methyl group is introduced into a side chain. Besides, owing to a methyl group introduced into a side chain, this section A has extremely low polarity.

On the other hand, a section having the structure represented by the structural formula (4) between two adjacent urethane bonds (hereinafter sometimes referred to as the "section B") also has extremely low polarity. Accordingly, the section A and the section B can be present in the surface layer without causing phase separation.

Moreover, the section B has crystallizability. As a result, highly crystallizable polyurethane including the structure represented by the structural formula (4) between two adjacent urethane bonds is present, in a filler-like form, in highly flexible polyurethane having the structure represented by the structural formula (1) and one or both of the structures represented by the structural formulas (2) and (3) between two adjacent urethane bonds. The binder resin seems to be thus reinforced as a whole. This is probably the reason why the surface layer according to the present invention is flexible as well as excellent in tearing resistance.

Owing to these functions, even when the binder resin is abraded in the convex portions formed by the resin particles during long-term image output, it is presumed that partially remaining portions of the binder resin hold down the resin particles so as to effectively suppress the falling of the resin particles.

The polyurethane resin used as the binder resin of the present invention can be obtained by reacting, with an isocyanate component, polyether diol (A') having the structure of the structural formula (1) and at least one structure selected from the group consisting of the structures represented by the structural formulas (2) and (3), or the polyether diol and polyol (B') having the structure of the structural formula (4).

The polyether diol (A') is specifically polyether diol obtained through ring opening copolymerization of tetrahydrofuran and 3-methyl-tetrahydrofuran. The polyol (B') is specifically polyol having a butadiene structure with a principal chain mainly including a 1,4 bond.

The polyurethane resin may contain, between two adjacent urethane bonds in the polyurethane, apart from the structure of the structural formula (1) and at least one structure selected from the group consisting of the structures of the structural formulas (2) and (3), polypropylene glycol and aliphatic polyester if necessary unless the effects of the present invention are not spoiled. An example of the aliphatic polyester includes aliphatic polyester polyol obtained through a condensation reaction between a diol component such as 1,4-butanediol, 3-methyl-1,5-pentanediol or neopentyl glycol, or a triol component such as trimethylolpropane, and dicarboxylic acid such as adipic acid, glutaric acid or sebacic acid.

Such a polyol component may be, if necessary, formed into a prepolymer through chain elongation with isocyanate such as 2,4-tolylene diisocyanate (TDI), 1,4-diphenylmethane diisocyanate (MDI) or isophorone diisocyanate (IPDI) in advance.

An isocyanate compound to be reacted with the polyol component is not particularly limited, and examples of the isocyanate compound that can be used include: aliphatic polyisocyanates such as ethylene diisocyanate and 1,6-hexamethylene diisocyanate; alicyclic polyisocyanates such as isophorone diisocyanate (IPDI), cyclohexane 1,3-diisocyanate and cyclohexane 1,4-diisocyanate; aromatic isocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate and naphthalene diisocyanate; and copolymers, isocyanurate thereof, TMP adducts and biuret forms thereof, and block bodies thereof.

Among these isocyanate compounds, the aromatic isocyanates such as tolylene diisocyanate, diphenylmethane diisocyanate and polymeric diphenylmethane diisocyanate is more suitably used.

Also such an isocyanate component may be precedently formed into a prepolymer through chain elongation with polyol. If isocyanate modified with polyol having a structure (A') is used as an isocyanate-terminated prepolymer, the number average molecular weight of the prepolymer can be 10000 or more and 15000 or less.

Besides, if the isocyanate is used in the form of an isocyanate-terminated prepolymer, the content of isocyanate in the prepolymer can be in the range of 3.0 to 5.0 mass %.

As for a mixing ratio of the isocyanate component to be reacted with the polyol component, a ratio of an isocyanate group to an hydroxyl group in the polyol can be in the range of 1.1 to 4.0.

The polyurethane resin particles of the present invention can have a low glass transition temperature, and specifically, the glass transition temperature can be −35° C. or less. When the glass transition temperature of the polyurethane resin particles is low, the polyurethane resin particles are unlikely to be hardened even at a low temperature, and hence, hardness increase of the surface layer caused at a low temperature can be suppressed.

Furthermore, when the polyurethane resin particles are soft, the particles absorb stress, so that the abrasion of the binder resin can be suppressed.

As materials for the polyurethane resin particles of the present invention, 3-methyl-1,5-pentanediol and adipic acid can be suitably used.

Furthermore, the polyurethane resin particles of the present invention can be coated with fine silica particles. When the resin particles are coated with the fine silica particles, the tearing of the binder resin can be further suppressed, so as to further suppress the falling of the particles. This is probably because the binder resin present around the polyurethane resin particles can be reinforced by the fine silica particles when the resin particles are coated with the fine silica particles.

For coating the polyurethane resin particles with the fine silica particles, a known coating method can be employed. As an apparatus to be used for coating, a conventional mixing apparatus such as a double cone mixer, a V-type mixer, a drum mixer, a super mixer, a Henschel mixer or a nauta mixer can be used.

Moreover, the fine silica particles can be in a state adhered onto the surfaces of the polyurethane resin particles. When the fine silica particles are adhered onto the surfaces of the polyurethane resin particles so that the fine silica particles are exposed, the polyurethane resin particles can be easily dispersed in the binder resin.

The polyurethane resin particles of the present invention are controlled to have an average particle size of preferably 1 to 30 μm and more preferably 3 to 15 μm. When the average particle size of the resin particles of the present invention is 1 μm or more, appropriate irregularities are formed on the surface of the developing roller, so that an image can be formed in a proper density.

Furthermore, when the average particle size of the resin particles is 30 μm or less, the falling of the particles can be suppressed. The average particle size of the resin particles contained in the surface layer can be simply obtained through observation of a cross-section of the layer with a microscope or the like.

The content of the polyurethane resin particles of the present invention can be 20 to 100 mass % in terms of a mass ratio. When the content falls within this range, a proper image density and the suppression of the falling of the particles can be both attained. Furthermore, in consideration of improvement of conveying property of the developing roller and the falling of the polyurethane resin particles, the content is more preferably 50 to 80 mass %.

The surface layer 4 can be conductive. For imparting the conductivity, an ion conductive agent or conductive fine particles can be added, and conductive fine particles that are inexpensive and have a minimal variation in resistance with environment can be suitably used. As the conductive fine particles, carbon black can be particularly used from the viewpoint of conductivity imparting property and reinforcing property.

As for properties of the conductive fine particles, carbon black having a primary particle size of 18 nm or more and 50 nm or less and DBP oil absorption of 50 ml/100 g or more and 160 ml/100 g or less can be used because such carbon black is well-balanced in the conductivity, the hardness and the dispersibility. The content of the conductive fine particles can be 10 mass % or more and 30 mass % or less based on 100 parts by mass of a resin component forming the surface layer.

The thickness of the surface layer 4 can be equal to or larger than the particle size of the polyurethane resin particles. When the thickness falls within this range, the polyurethane resin particles can be easily covered and held by the binder resin.

A method for forming the surface layer 4 is not particularly limited, and examples of the method include a method for spraying a coating, a dipping method and a roll coating method. With respect to a dip coating method, a method in which a coating is overflown from an upper edge of a dipping vat as described in Japanese Patent Application Laid-Open No. 57-5047 is simple and excellent in production stability as the method for forming the surface layer.

Figure 2:
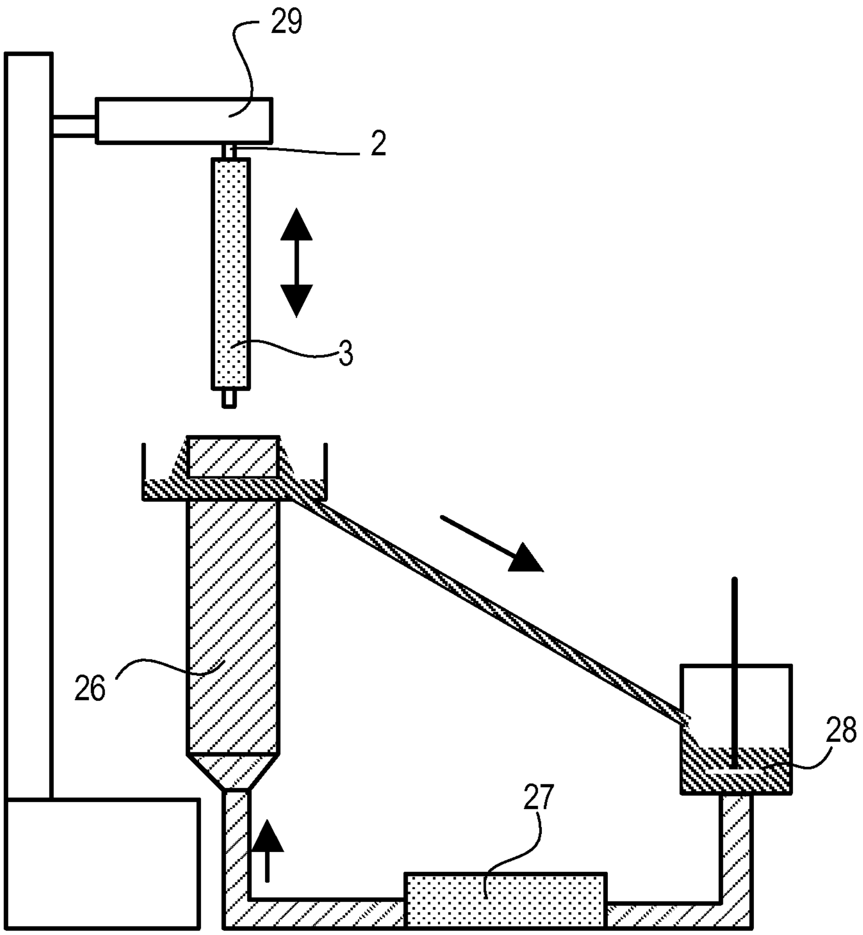
FIG. 2 is a schematic diagram illustrating an example of a structure of a dip coating apparatus for a developing roller of the present invention.

FIG. 2 is a schematic diagram of a dip coating apparatus. A reference sign 26 denotes a cylindrical dipping vat, which has an inner diameter slightly larger than the outer diameter of a developing roller and has a depth larger than the axial length of the developing roller. A ring-shaped liquid receiving part is provided on the outer periphery of the upper edge of the dipping vat 26 and is connected to a stirring tank 28. The bottom of the dipping vat 26 is connected to the stirring tank 28. A coating held in the stirring tank 28 is fed to the bottom of the dipping vat 26 by a liquid supplying pump 27. The coating is overflown from the upper edge of the dipping vat, so as to return to the stirring tank 28 through the liquid receiving part provided on the outer periphery of the upper edge of the dipping vat 26. A mandrel 2 having an elastic layer 3 thereon is vertically fixed on a lifting apparatus 29 and is dipped in and drawn up from the dipping vat 26, so as to form a surface layer 4 thereon.

(Electrophotographic Image Forming Apparatus)

Figure 3:
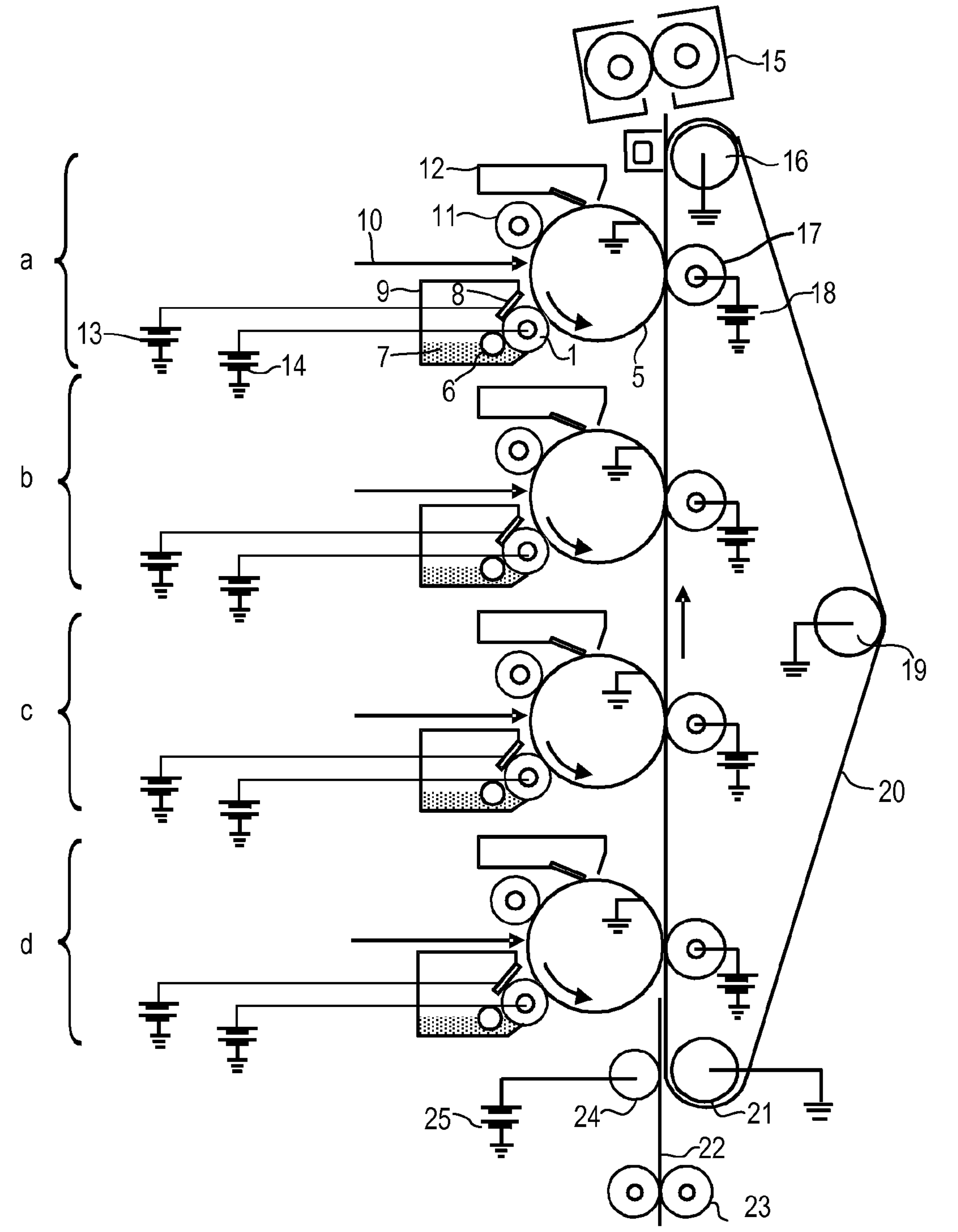
FIG. 3 is a schematic diagram illustrating an example of a structure of an electrophotographic image forming apparatus according to the present invention.

FIG. 3 illustrates an example of a electrophotographic image forming apparatus of the present invention. In FIG. 3, image forming units a to d are provided to toners of respective colors, namely, a yellow toner, a magenta toner, a cyan toner and a black toner. In each of the image forming units a to d, a photoconductor 5 is provided as an electrostatic latent image carrier rotated in an arrow direction. Around each photoconductor 5, a charging apparatus 11 for uniformly charging the photoconductor 5, an exposing unit not shown for forming an electrostatic latent image by irradiating, with a laser beam 10, the photoconductor 5 having been uniformly charged, and a developing apparatus 9 for developing the electrostatic latent image by supplying the tonner to the photoconductor 5 having the electrostatic latent image formed thereon are provided.

On the other hand, a transferring/conveying belt 20 for conveying a recording material 22 such as paper supplied by a paper feeding roller 23 is suspended on a driving roller 16, an idler roller 21 and a tension roller 19. Charge of an adsorption bias power source 25 is applied to the transferring/conveying belt 20 via an adsorption roller 24, so as to convey the recording material 22 electrostatically adhered on the surface of the transferring/conveying belt.

A transfer bias power source 18 is provided for applying charge for transferring a toner image having been formed on the photoconductor 5 of each of the image forming units a to d onto the recording material 22 conveyed by the transferring/conveying belt 20. A transfer bias is applied via a transfer roller 17 disposed on a back face side of the transferring/conveying belt 20. The toner images of the respective colors formed in the image forming units a to d are successively transferred to be superimposed on the recording material 22 conveyed by the transferring/conveying belt 20 movable in synchronization with the image forming units a to d.

The color electrophotographic image forming apparatus further includes a fixing apparatus 15 for fixing the toner images superimposed and transferred on the recording material 22 by, for example, heating, and a conveying apparatus (not shown) for discharging the recording material 22 having an image formed thereon to the outside of the image forming apparatus.

On the other hand, each image forming unit includes a cleaning apparatus 12 having a cleaning blade for cleaning the surface of the photoconductor 5 by removing remaining transfer toner remaining thereon without being transferred. The photoconductor 5 having been cleaned is placed in an image formable state to wait for next image formation.

The developing apparatus 9 provided in each image forming unit includes a developer container 7 holding a non-magnetic developer as a one-component developer; and a developing roller 1 provided to cover an opening of the developer container 7 and to oppose the photoconductor in a portion thereof exposed from the developer container.

In the developer container 7, a developer supplying roller 6 for supplying the toner to the developing roller 1 as well as for scraping off the toner not used for development but remaining on the developer roller 1 after the development; and a developer amount regulating member 8 for forming a thin film of the toner on the developer roller 1 and frictionally charging the toner are provided. The developer supplying roller 6 and the developer amount regulating member 8 are disposed to be in contact with the developing roller 1. The developer amount regulating member 8 is connected to a developer amount regulating member bias power source 13, and the developing roller 1 is connected to a developing roller bias power source 14, so that charges can be applied to the developer amount regulating member 8 and the developing roller 1 in an image forming operation. A voltage output from the developer amount regulating member bias power source 13 is lower by 50 V to 400 V than a voltage output from the developing roller bias power source 14.

(Electrophotographic Process Cartridge)

Figure 4:
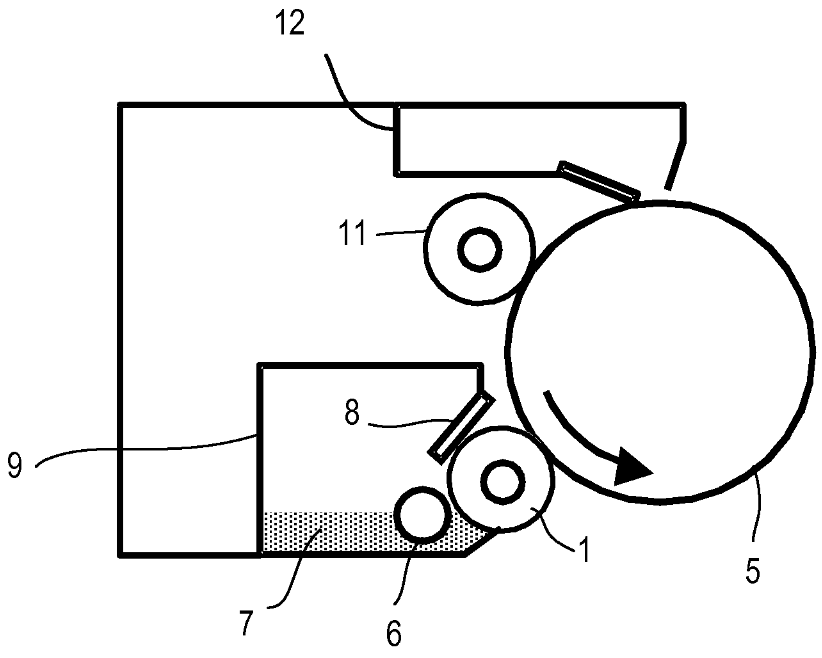
FIG. 4 is a schematic diagram illustrating an example of a structure of an electrophotographic process cartridge of the present invention.

FIG. 4 illustrates an example of a electrophotographic process cartridge of the present invention. The electrophotographic process cartridge of FIG. 4 includes a developing apparatus 9, a photoconductor 5 and a cleaning apparatus 12, which are integrated to be removably attached to a main body of an electrophotographic image forming apparatus. The developing apparatus 9 can be similar to that described above with respect to the electrophotographic image forming apparatus. The electrophotographic process cartridge of the present invention may additionally include, integrally with the aforementioned members, a transferring member for transferring a toner image having been formed on the photoconductor 5 onto a recording material 22, and the like.

EXAMPLES

Production Examples of Polyurethane Resin Particles (Preparation of Polyurethane Resin Particles 1)

A 2-L separable flask equipped with a stirrer was charged with 900 parts by mass of water, and 30 parts by mass of "Metolose 90SH-100" (trade name, manufactured by Shin-Etsu Chemical Co., Ltd.) was dissolved in the water, so as to prepare a dispersion medium.

Furthermore, 200 parts by mass of polyester polyol "Kuraray Polyol P-6010" (trade name, manufactured by Kuraray Co., Ltd.) obtained through a reaction between 3-methyl-1,5-pentanediol and adipic acid, 120 g of isocyanurate-type polyisocyanate derived from hexamethylene diisocyanate, 100 parts by mass of methyl ethyl ketone (MEK) and 0.003 parts by mass of dibutyltin dilaurate were mixed, so as to prepare a raw material of polyurethane resin particles.

The raw material was added to the dispersion medium with stirring at 600 rpm, so as to prepare a suspension. Subsequently, the suspension was heated to 60° C. with continuously stirring, a reaction was conducted for 5 hours, and the resultant was cooled to room temperature and then subjected to solid-liquid separation. The thus obtained solid was sufficiently washed with water and dried at 70° C. for 20 hours, so as to obtain polyurethane resin particles 1 having an average particle size of 10 μm and a glass transition temperature of −52° C.

(Preparation of Polyurethane Resin Particles 2)

Polyurethane resin particles 2 were obtained by externally adding 1.0 part by mass of fine silica particles (trade name:

OX50, manufactured by Nippon Aerosil Co., Ltd.) to 100 parts by mass of polyurethane resin particles 1. The external addition was conducted by performing a treatment with a Henschel mixer (manufactured by Mitsui Miike Machinery Co., Ltd.) at 3000 rotations/min for 15 minutes.

(Preparation of Polyurethane Resin Particles 3)

Polyurethane resin particles 3 were obtained by externally adding 4.5 parts by mass of fine silica particles (trade name: OX50, manufactured by Nippon Aerosil Co., Ltd.) to 100 parts by mass of polyurethane resin particles 1. The external addition was conducted in the same manner as in the preparation of polyurethane resin particles 2.

(Production Examples of Isocyanate-Terminated Prepolymers)

(Synthesis of Isocyanate-Terminated Prepolymer A)

In a nitrogen atmosphere, 200.0 parts by mass of polyol (trade name: PTG-L2000, manufactured by Hodogaya Chemical Co., Ltd.) having the structure represented by the structural formula (1) and one or both of the structures represented by the structural formulas (2) and (3) was slowly dropped into 80.0 parts by mass of polymeric MDI (trade name: Cosmonate MDI, manufactured by Mitsui Chemicals, Inc.) in a reactor with an inside temperature kept at 65° C. After completing dropping, a reaction was conducted at 65° C. for 2 hours. The thus obtained reaction mixture was cooled to room temperature, so as to obtain 230 parts by mass of isocyanate-terminated urethane prepolymer A having a content of isocyanate group of 3.8% (hereinafter sometimes referred to as "isocyanate A").

(Synthesis of Isocyanate-Terminated Prepolymer B)

In a nitrogen atmosphere, 200.0 parts by mass of polypropylene glycol-based polyol (trade name: Excenol 1030, manufactured by Sanyo Chemical Industries, Ltd.) was slowly dropped into 70.4 parts by mass of tolylene diisocyanate (trade name: Cosmonate 80, manufactured by Mitsui Chemicals, Inc.) in a reactor with an inside temperature kept at 65° C. After completing dropping, a reaction was conducted at 65° C. for 2 hours. The thus obtained reaction mixture was cooled to room temperature, so as to obtain 248 parts by mass of isocyanate-terminated urethane prepolymer B with a content of isocyanate group of 4.9% (hereinafter sometimes referred to as "isocyanate B").

(Synthesis of Isocyanate-Terminated Prepolymer C)

In a nitrogen atmosphere, 180.0 parts by mass of polyol (trade name: PTG2000, manufactured by Hodogaya Chemical Co., Ltd.) having the structure represented by the structural formula (1) was slowly dropped into 80.0 parts by mass of polymeric MDI (trade name: Cosmonate MDI, manufactured by Mitsui Chemicals, Inc.) in a reactor with an inside temperature kept at 65° C. After completing dropping, a reaction was conducted at 65° C. for 2 hours. The thus obtained reaction mixture was cooled to room temperature, so as to obtain 250 parts by mass of isocyanate-terminated urethane prepolymer C with a content of isocyanate group of 3.9% (hereinafter sometimes referred to as "isocyanate C").

Production Examples of Developing Roller

Example 1

Production of Mandrel 2

A mandrel 2 was prepared by coating an SUS304 mandrel having an outer diameter of 6 mm and a length of 280 mm with a primer (trade name: DY35-051, manufactured by Dow Corning Toray Co., Ltd.) and baking the resultant.

<Production of Elastic Layer 3>

Subsequently, the mandrel 2 was placed in a mold, and an addition-type silicone rubber composition obtained by mixing the following materials was injected into a cavity formed in the mold:

100 parts by mass of a liquid silicone rubber material (trade name: SE6724A/B, manufactured by Dow Corning Toray Co., Ltd.);

35 parts by mass of carbon black (trade name: Tokablack #7360SB, manufactured by Tokai Carbon Co., Ltd.);

0.2 parts by mass of a silica powder; and 0.1 parts by mass of a platinum catalyst.

Thereafter, the mold was heated for vulcanizing the silicone rubber for curing at 150° C. for 15 minutes. After removing the mold, the silicone rubber was further heated at 180° C. for 1 hour so as to complete the curing reaction. Thus, an elastic layer 3 having a thickness of 3 mm was provided on the circumferential face of the mandrel 2.

<Production of Surface Layer 4>

As a raw material for a surface layer 4, 40.0 parts by mass of polyol having the structure of the structural formula (4) (trade name: Poly Bd R-15HT, having a molecular weight of 1200, manufactured by Idemitsu Kosan Co., Ltd.), polyol having the structure represented by the structural formula (1) and one or both of the structures represented by the structural formulas (2) and (3) (trade name: PTG-L2000, having a molecular weight of 2000, manufactured by Hodogaya Chemical Co., Ltd.), 100 parts by mass of isocyanate-terminated prepolymer A, and 36.0 parts by mass of carbon black (trade name: MA230, manufactured by Mitsubishi Chemical Corporation) were mixed and stirred. Thereafter, the thus obtained mixture was dissolved in and mixed with methyl ethyl ketone so as to attain a total solid content of 30 mass % and the resultant was treated with a sand mill for attaining uniform dispersion.

To 100 parts by mass of the solid content of the material mixture obtained as above, 70.0 parts by mass of polyurethane resin particles 3 were added and dispersed by stirring with a ball mill, so as to obtain a surface layer forming coating. The surface layer forming coating was diluted with methyl ethyl ketone so as to attain viscosity of 10 to 13 cps, and the diluted composition was coated on the elastic layer. The liquid circulating type dip coating apparatus of FIG. 2 was used for coating. The reference sign 26 of FIG. 2 denotes the cylindrical dipping vat, which has an inner diameter slightly larger than the outer diameter of a developing roller and has a depth larger than the axial length of the developing roller. The ring-shaped liquid receiving part is provided on the outer periphery of the upper edge of the dipping vat 26 and is connected to the stirring tank 28. The bottom of the dipping vat 26 is connected to the stirring tank 28. The coating held in the stirring tank 28 is fed to the bottom of the dipping vat 26 by the liquid supplying pump 27. The coating is overflown from the upper edge of the dipping vat, so as to return to the stirring tank 28 through the liquid receiving part provided on the outer periphery of the upper edge of the dipping vat 26. The mandrel 2 having the elastic layer 3 thereon is vertically fixed on the lifting apparatus 29 and is dipped in and drawn up from the dipping vat 26, so as to coat the elastic layer 3 with the coating. The coating thus coated was dried and then heated at a temperature of 150° C. for 1 hour, so as to form a surface layer 4 having a thickness of 20 μm on the circumferential face of the elastic layer. In this manner, a developing roller of Example 1 was obtained. When the obtained developing roller was observed, irregularities formed by the polyurethane resin particles were found.

Examples 2 to 8

Developing rollers of Examples 2 to 8 were obtained in the same manner as in Example 1 except that the polyol, the isocyanate and the polyurethane resin particles were changed to those shown in Table 1. Incidentally, details of materials listed in the table are as follows:

"PTG-L1000" (trade name): polyol having the structure represented by the structural formula (1) and one or both of the structures represented by the structural formulas (2) and (3) (having a molecular weight of 1000, manufactured by Hodogaya Chemical Co., Ltd.);

"PTG-L3000" (trade name): polyol having the structure represented by the structural formula (1) and one or both of the structures represented by the structural formulas (2) and (3) (having a molecular weight of 3000, manufactured by Hodogaya Chemical Co., Ltd.); and "Poly Bd R-45HT" (trade name): polyol having the structure of the structural formula (4) (having a molecular weight of 2800, manufactured by Idemitsu Kosan Co., Ltd.).

Incidentally, "Poly Bd R-15HT" and "Poly Bd R-45HT" described above are both hydroxyl-terminated liquid polybutadiene compounds having a structure represented by the following formula:

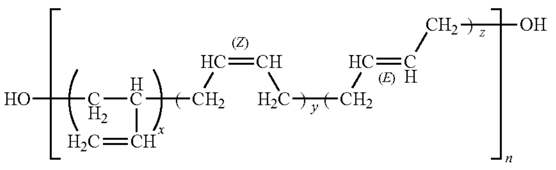

wherein x, y, z and n each independently represent an integer of 1 or more.

Examples 9 and 10

Developing rollers of Examples 9 and 10 were obtained in the same manner as in Example 1 except that the polyurethane resin particles were changed to those shown in Table 1.

Comparative Examples 1 and 2

Developing rollers of Comparative Examples 1 and 2 were obtained in the same manner as in Example 1 except that the polyol, the isocyanate and the polyurethane resin particles were changed to those shown in Table 1.

Evaluation

The developing rollers produced in the examples and the comparative examples were evaluated as follows:

First, the surface state of each developing roller was checked by observing the surface.

Next, an image output with the developing roller attached to an electrophotographic image forming apparatus was evaluated, so as to check image performance of the developing roller.

Ultimately, the surface of the developing roller was observed again for comparing a result of the surface observation performed after the image output evaluation with the observation result obtained at first. Thus, change of the surface of the developing roller caused through the image output evaluation was confirmed.

Next, specific methods for these evaluations will be described.

(Evaluation 1-1: Surface Observation of Developing Roller in Initial State)

The surface of a fresh developing roller prior to an electrophotographic image output test described later was observed with a laser microscope (trade name: VK-8700, manufactured by Keyence Corporation, magnification of objective lens: 50×), and the number of convex portions formed by resin particles present within a rectangular area of 250 μm×200 μm on the surface of the developing roller was counted.

(Evaluation 2: Electrophotographic Image Output Test)

As an electrophotographic image forming apparatus, a laser printer (trade name: CLJ CP4525, manufactured by Hewlett-Packard Company) having the constitution illustrated in FIG. 3 was prepared. The developing roller to be evaluated was incorporated into a process cartridge of this laser printer. The process cartridge was attached to the laser printer and was left to stand still in a low-temperature low-humidity environment of an environmental temperature of 15° C. and relative humidity of 10% for 24 hours.

While the process cartridge was left to stand, a linear pressure of the developer amount regulating member against the developing roller was set to 50 gf/cm, which is higher than a

TABLE 1

| | | Binder resin | | | | | | | | Poly-urethane |
|---|---|---|---|---|---|---|---|---|---|---|
| | | Polyol | | | | Isocyanate | | | | |
| | | Component 1 | | Component 2 | | | | | | |
| | | Type | parts by mass | Type | parts by mass | Name | Type | Modified with | parts by mass | rein particles No. |
| Examples | 1 | Poly-Bd-R15HT | 40 | PTG-L2000 | 60 | Isocyanate A | P-MDI | PTG-L2000 | 245 | 3 |
| | 2 | " | 20 | " | 80 | " | " | " | 233 | 3 |
| | 3 | " | 80 | " | 20 | " | " | " | 271 | 3 |
| | 4 | " | 100 | " | 10 | " | " | " | 405 | 3 |
| | 5 | " | 40 | PTG-L1000 | 60 | " | " | " | 372 | 3 |
| | 6 | " | 40 | PTG-L3000 | 60 | " | " | " | 200 | 3 |
| | 7 | Poly-Bd-R45HT | 40 | PTG-L2000 | 60 | " | " | " | 183 | 3 |
| | 8 | Poly-Bd-R15HT | 20 | " | 80 | Isocyanate B | TDI | PPG | 180 | 3 |
| | 9 | " | 40 | " | 60 | Isocyanate A | P-MDI | PTG-L2000 | 100 | 1 |
| | 10 | " | 40 | " | 60 | " | " | " | 100 | 2 |
| Comparative | 1 | — | — | PTG2000(*) | 100 | Isocyanate C | " | PTG2000 (*) | 220 | 3 |
| Examples | 2 | Poly-Bd-R15HT | 100 | — | — | Isocyanate B | TDI | PPG | 171 | 3 |

(*) "PTG2000" (trade name, manufactured by Hodogaya Chemical Co., Ltd.) is polyol having the structure represented by the structural formula (1) alone and having a molecular weight of 2000.

general value. Next, 40000 electrophotographic images were output at a process speed of 42 copies/min.

An electrophotographic image output herein was an image of an alphabetic character "E" with a size of 4 points printed at a coverage rate of 0.5% on letter size paper (trade name: "Business Multipurpose 4200", manufactured by Xerox Corporation). Furthermore, the printing mode was set to an intermittent mode in which the rotation of the electrophotographic photoconductor was stopped once every time letter size paper was output so as to take 10 seconds to output one copy.

Thereafter, a halftone image with a printing density of 25% was output, and this image was visually observed so as to evaluate, on the basis of the following criteria, the presence and the extent of a dot-shaped defect caused in the electrophotographic image due to fusion of a toner onto a resin particle lost portion on the surface of the developing roller.

A: No image defect due to the fusion of a toner onto a particle lost portion on the surface of the developing roller is found.

B: A dot-shaped defect due to the fusion of a toner onto a particle lost portion on the surface of the developing roller is merely slightly found.

C: A dot-shaped defect due to the fusion of a toner onto a particle lost portion on the surface of the developing roller is found.

D: A dot-shaped defect due to the fusion of a toner onto a particle lost portion on the surface of the developing roller is clearly found.

(Evaluation 1-2: Surface Observation of Developing Roller after Image Output)

The developing roller having been used for the formation of the electrophotographic images for Evaluation 2 was taken out of the process cartridge, and the toner adhered onto the surface of the developing roller was removed by air blow. Subsequently, the same area as that observed in Evaluation 1-1 was observed in the same manner as in Evaluation 1-1, so as to count the number of resin particles having fallen off from the surface of the developing roller. A rate of the number of resin particles fallen off to the number of convex portions formed by the resin particles counted in Evaluation 1-1, namely, a resin particle falling rate (=the number of resin particles fallen off×100/the number of convex portions formed by the resin particles on the surface of the developing roller in an initial state) was calculated, so as to be evaluated based on the following criteria:

A: The resin particle falling rate is 0%, namely, none of the resin particles is found to have fallen off from the surface of the developing roller even through the formation of electrophotographic images for Evaluation 2;

B: the resin particle falling rate exceeds 0% and is lower than 5%;

C: the resin particle falling rate exceeds 5% and is lower than 10%; and

D: the resin particle falling rate exceeds 10%.

The results of the image evaluation and the observation results of the surfaces of the developing rollers are shown in Table 2.

TABLE 2

| | Polyurethane binder resin Structures (1) to (4) present between urethane groups | Polyurethane resin particles Amount of externally added silica (parts by mass based on 100 parts by mass of particles) | (Evaluation 1-2) | (Evaluation 2) |
|---|---|---|---|---|
| Example 1 | (1), (2), (3), (4) | 4.5 | A | A |
| Example 2 | (1), (2), (3), (4) | 4.5 | B | B |
| Example 3 | (1), (2), (3), (4) | 4.5 | B | B |
| Example 4 | (1), (2), (3), (4) | 4.5 | B | B |
| Example 5 | (1), (2), (3), (4) | 4.5 | B | B |
| Example 6 | (1), (2), (3), (4) | 4.5 | B | B |
| Example 7 | (1), (2), (3), (4) | 4.5 | B | B |
| Example 8 | (1), (2), (3), (4) | 4.5 | B | B |
| Example 9 | (1), (2), (3), (4) | 0 | C | C |
| Example 10 | (1), (2), (3), (4) | 1.0 | B | B |
| Comparative Example 1 | (1), (2), (3) | 4.5 | D | D |
| Comparative Example 2 | (4) | 4.5 | B | D |

It is understood, based on the results of Examples 1 to 8, that the developing roller having the polyurethane resin binder structure of the present invention may suppress the falling the resin particles, suppress formation of abnormal images derived from the fusion of a toner and cause no practical problem as compared with those of Comparative Examples 1 and 2 not having the urethane resin structure of the present invention. Furthermore, it is understood, based on the results of Examples 1, 9 and 10, that much better results were obtained when the polyurethane resin particles were coated with an appropriate amount of silica. Besides, although the falling of resin particles was suppressed in Comparative Example 2, the quality of images was degraded due to toner filming caused on the developing roller.

Preferred embodiments of the present invention will now be described in detail in accordance with the accompanying drawings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-288329, filed Dec. 28, 2011 and No. 2012-267390, filed Dec. 6, 2012 which are hereby incorporated by reference herein in their entirety.

What is claimed is:

1. A developing member comprising a substrate and a surface layer, wherein:

the surface layer comprises a polyurethane resin as a binder resin and polyurethane resin particles dispersed in the binder resin, and the polyurethane resin as a binder resin has, between two adjacent urethane bonds, a structure represented by the following structural formula (1) and one or both of structures represented by the following structural formulas (2) and (3), and wherein:

the polyurethane resin as a binder resin further has, between two adjacent urethane bonds, a structure represented by the following structural formula (4):

Structural formula (1)

$$-CH_2-CH_2-CH_2-CH_2-O-$$

Structural formula (2)

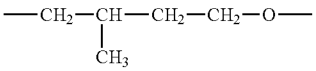

Structural formula (3)

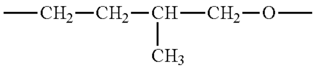

Structural formula (4)

$$-CH_2-CH{=}CH-CH_2-.$$

2. The developing member according to claim 1, wherein the polyurethane resin particles have surfaces coated with fine silica particles.

3. An electrophotographic apparatus comprising a developing member according to claim 1.

4. A process cartridge comprising a developing member according to claim 1, wherein the process cartridge is configured to be removably attachable to a main body of an electrophotographic apparatus.

* * * * *